(12) United States Patent
Morelli

(10) Patent No.: US 9,616,965 B2
(45) Date of Patent: Apr. 11, 2017

(54) AUTOMATIC PEDAL FOR BICYCLES

(71) Applicant: Angelo Morelli, Pontenure (IT)

(72) Inventor: Angelo Morelli, Pontenure (IT)

( * ) Notice: Subject to any disclaimer, the term of this patent is extended or adjusted under 35 U.S.C. 154(b) by 157 days.

(21) Appl. No.: 14/018,181

(22) Filed: Sep. 4, 2013

(65) Prior Publication Data

US 2014/0060245 A1 Mar. 6, 2014

(30) Foreign Application Priority Data

Sep. 5, 2012 (IT) ............................... MI2012A1483

(51) Int. Cl.
  *B62M 3/00* (2006.01)
  *B62M 3/08* (2006.01)

(52) U.S. Cl.
  CPC ............ *B62M 3/086* (2013.01); *Y10T 74/217* (2015.01)

(58) Field of Classification Search
  CPC ......... B62M 3/08; B62M 3/083; B62M 3/086
  USPC ........................................................ 74/594.6
  See application file for complete search history.

(56) References Cited

U.S. PATENT DOCUMENTS

| 4,201,120 A | 5/1980 | Segawa |
| 4,331,043 A | 5/1982 | Shimano |
| 4,932,287 A * | 6/1990 | Ramos .......................... 74/594.6 |
| 5,048,369 A | 9/1991 | Chen |
| 5,199,324 A * | 4/1993 | Sain ............................. 74/594.4 |
| 5,203,229 A | 4/1993 | Chen |
| 5,377,561 A * | 1/1995 | Danieli et al. ............... 74/594.6 |
| 5,470,277 A | 11/1995 | Romano |
| 6,076,427 A * | 6/2000 | Nutto et al. ................. 74/594.6 |
| 6,543,310 B1 * | 4/2003 | Baker et al. ................. 74/594.6 |
| 7,017,445 B2 * | 3/2006 | Bryne .......................... 74/594.6 |
| 8,025,304 B2 | 9/2011 | Smith |
| 2005/0155452 A1 * | 7/2005 | Frey ............................. 74/594.6 |

(Continued)

FOREIGN PATENT DOCUMENTS

| EP | 0542238 A1 | 5/1993 |
| EP | 0774407 A1 | 5/1997 |

(Continued)

OTHER PUBLICATIONS

Office Action of Apr. 17, 2015 from U.S. Appl. No. 14/018,094 to Angelo Morelli filed Sep. 4, 2013.

(Continued)

*Primary Examiner* — Vicky Johnson
(74) *Attorney, Agent, or Firm* — Vorys, Sater, Seymour and Pease LLP

(57) ABSTRACT

An automatic pedal for bicycles comprising a main body provided with means for its pivoting along an axis to a pedal crank, the main body comprising a compartment arranged to abuttingly house a first portion of a cleat associated with a shoe of a cyclist, and a coupling element pivoted to the main body and spring loaded, adapted to cooperate with a second portion of said cleat to removable fix, together with said compartment, the cleat to the main body, in which said compartment comprises at least one first and one second seat arranged to alternatively abuttingly receive said first portion of the cleat, the first seat being closer to the axis of said pivotal means than the second seat, such that the cyclist is able to choose where to abuttingly position the cleat, hence adjusting the position of the shoe relative to the pivotal axis.

19 Claims, 5 Drawing Sheets

(56) References Cited

U.S. PATENT DOCUMENTS

2006/0162489 A1    7/2006   Raad et al.
2007/0182122 A1    8/2007   Smith
2014/0060243 A1    3/2014   Morelli

FOREIGN PATENT DOCUMENTS

FR     383221 A    2/1908
FR     2526392 A1    11/1983
FR     2594402 A1    8/1987
FR     2623464 A1    5/1989

OTHER PUBLICATIONS

Search Report dated May 10, 2013 from Italian application MI2012A001483, filed Sep. 5, 2012.
Search Report dated May 10, 2013 from Italian application MI2012A001481, filed Sep. 5, 2012.

\* cited by examiner

AUTOMATIC PEDAL FOR BICYCLES

The present invention relates to a pedal of automatic type for bicycles, preferably racing bicycles.

Known bicycles are equipped with "quick release" pedals which by suitable mechanisms lock a cleat disposed below special shoes worn by cyclists. Essentially these pedals present a compartment, disposed in the front part of the pedal, in which a part of the cleat becomes wedged.

The rear of the cleat instead engages in a hook pivoted to the pedal body and loaded by powerful springs. When a cyclist rests the foot (and hence the cleat) on the pedal, the front part of the cleat becomes wedged in the compartment while the rear part rests on the upper surface of the hook. The top of the hook presents lead-in chutes. Consequently if the foot is pressed vertically towards the pedal, the hook is made to slide rearwards and, urged by the springs, traps the rear part of the cleat.

In this manner the shoe remains securely fixed to the pedal as long as the cyclist applies a vertical force to the pedals. The cyclist is hence able both to push the pedal and to pull it upwards to develop greater pedalling power.

When the cyclist needs to release the shoe from the pedal the foot has merely to be twisted outwards, to easily release the cleat from the hook and from the compartment.

The aforedescribed pedals are much used but present the drawback of not being able to specifically adjust the position of the shoe relative to the pedal, or rather, although this adjustment could be made by moving the cleat relative to the shoe, it is certainly not possible to adjust or change this position while racing or while using the bicycle.

An object of the present invention is therefore to provide an automatic pedal which enables the position of the cleat to be varied relative to the pedal, even during use of the bicycle.

These and other objects are attained by providing an automatic pedal in accordance with the technical teaching of the accompanying claims.

Further characteristics and advantages of the invention will be apparent from the description of a preferred but non-exclusive embodiment of the automatic pedal, illustrated by way of non-limiting example in the accompanying drawings, in which.

Figure 1:
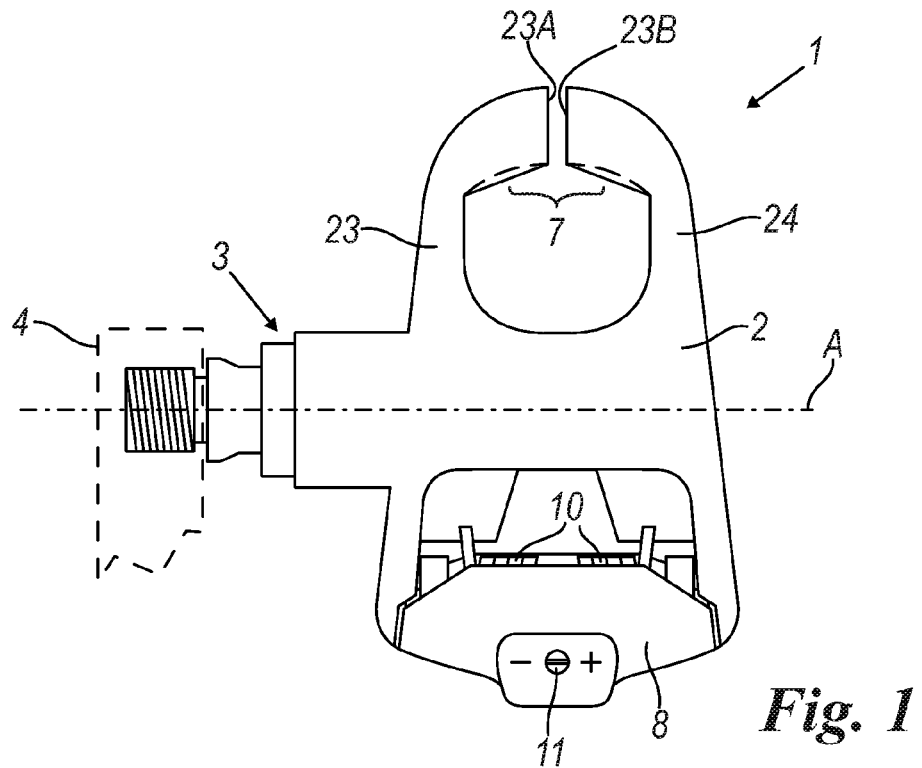
FIG. 1 is a plan view of the automatic pedal according to the present invention, when associated with a pedal crank, partly represented.
Figure 2:
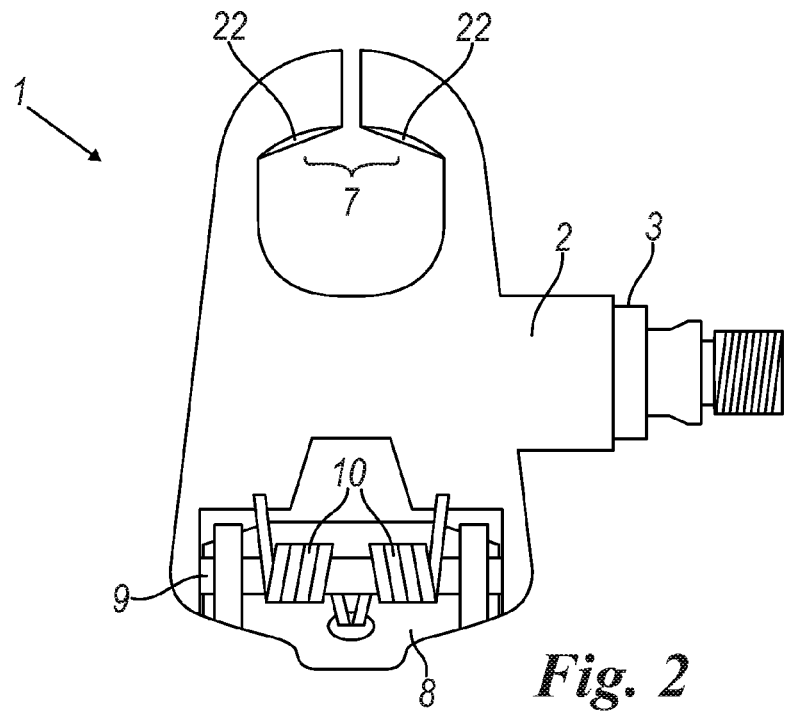
FIG. 2 is a view of the pedal of FIG. 1, from below.

With reference to said figures, these show an automatic pedal indicated by the reference numeral 1.

The automatic pedal 1 is formed from a main body 2 formed preferably of steel or another similar material. Associated with the main body there are pivotal means of conventional type enabling a pedal crank 4 (partially represented in FIG. 1) to be fixed thereto (by a thread).

In particular, the pivotal means 3 enable the main body to rotate freely about a substantially horizontal axis A.

Figure 3:
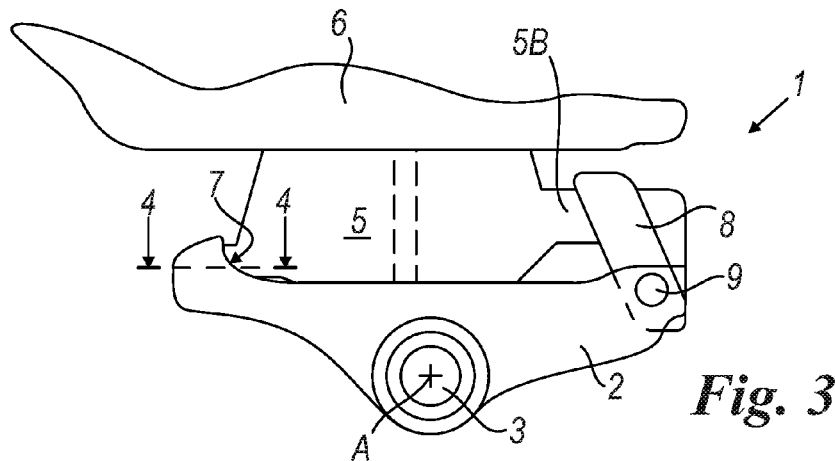
FIG. 3 is a lateral view of the pedal of FIG. 1, also partly showing a shoe and cleat coupled to the pedal.

The automatic pedal 1 is configured such as to be able to removably fix a cleat 5 present on the underside of the sole 6 of a cycling shoe. The cleat and shoe are partly represented in FIG. 3.

To enable it to be coupled to the cleat, the main body 2 comprises in particular a compartment 7 arranged to house a first front portion 5A of this cleat. The pedal also comprises a hook-configured element 8 pivoted by a pin 9 to the main body and urged by a pair of powerful springs 10. The load exerted by the springs on the hook can be adjusted by a suitable adjustment screw 11, in totally conventional manner. The hook configured in this manner is arranged to cooperate with a second portion 5B of said cleat to removably fix it to the pedal.

The hook 8 and compartment 7 hence cooperate in fixing the shoe (by means of the cleat) to the pedal.

According to the present invention, the compartment 7 has a particular configuration which includes a first seat 20 and a second seat 21 within which the first portion of the cleat can be alternatively disposed, and be securely contained during pedalling, such as to rigidly associate the shoe with the pedal. The cleat and shoe are stably retained by the pedal, with the cleat cooperating with the first or with the second seat and with the hook, until the cyclist causes the shoe to undergo a twisting movement, used to move it from the first to the second seat, or vice versa, or to finally release the cleat from the pedal.

Figure 4:
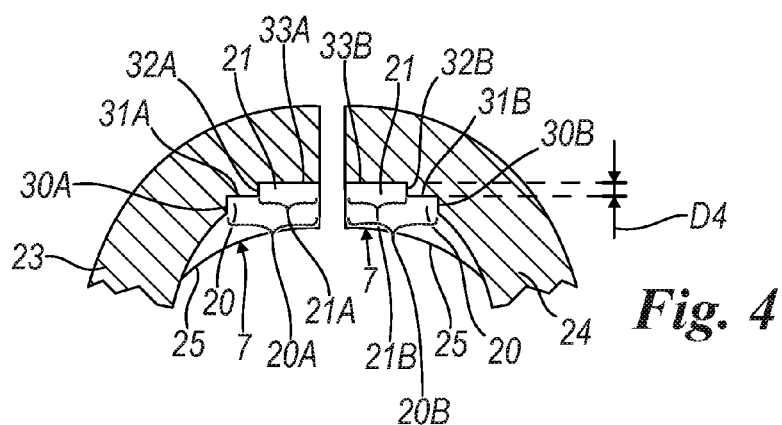
FIG. 4 is a section taken on the line 4-4 of FIG. 3, with the cleat released from the pedal.

The first and second seat are well visible in the sectional view of FIG. 4. As can be easily noted, the first seat 20 is closer to the axis A of said pivotal means 3 than the second seat 21, which is further therefrom.

The cyclist can hence choose where to abuttingly position the cleat, hence adjusting the position of the shoe relative to the pivotal axis to achieve, according to the racing conditions or to the cyclist's physical characteristics, a performance which is always optimal, by choosing a more "pointed" or "flat" pedal stroke.

In the embodiment described here in detail, two shoe positions are possible, however more positions can evidently be provided.

Passing to a more detailed description of the compartment 7, this is provided at the ends of two arms 23, 24 which form part of the main body 2. These arms are bent such that the end 23A of the first arm 23 lies facing the end 24A of the second arm 24.

As can be seen from the figures, the compartment 7 is defined by an upper wall 22 and a lower wall 25 which vertically confine the movement of said cleat when this is inserted into the compartment.

As this latter is formed straddling the two arms, it can be seen that the upper wall 22 is formed partly in the first arm and partly in the second arm. The same applies to the lower wall 25.

In particular, the upper wall and lower wall are common to both the seats provided in the compartment, whereas these seats are bounded frontally and laterally by walls which enable the cleat to be positioned alternatively in one or the other. In particular, these seats are provided in and visible in a front wall of the compartment.

As stated heretofore, the compartment 7 is formed within the first and second arms, which are symmetrically disposed and face each other precisely within the zone in which the compartment is formed.

The first seat is defined by a first recess 20A and a second recess 20B formed in the first arm 23 and second arm 24 respectively. Each recess comprises a lateral containing wall 30A, 30B of the cleat, and a frontal containing wall 31A, 31B against which the cleat abuts. The frontal containing wall of said first recess 20A and second recess 20B are aligned. The second seat 21 is defined by a third recess 21A and a fourth recess 21B also formed in the first arm 23 and second arm 24 respectively. Each of said third recess 21A and fourth recess 21B comprises a lateral containing wall 32A, 32B formed adjacent to the front wall 31A, 31B of said first or second recess, and a frontal containing wall 33A, 33B. Again in this case the frontal containing walls 33A, 33B of said third recess 21A and fourth recess 21B are aligned and disposed in a position further from the pivotal axis A than the front walls 31A, 31B of the recesses defining said first seat 20.

It should be noted that the lateral containing walls 30A, 30B of the first and of the second recess are substantially parallel to each other and spaced apart such as to be able to receive and house the cleat, in a configuration in which said arms are substantially in a non-flexed or rest position. Essentially, the distance between the lateral walls 30A and 30B of the first seat is substantially equal (slightly greater to enable its free insertion) to the width L of the cleat.

In contrast, when the arms are in a rest position, the lateral walls 32A and 32B of the third and fourth recess are at a distance apart less than the width L of the cleat.

Figure 4A:
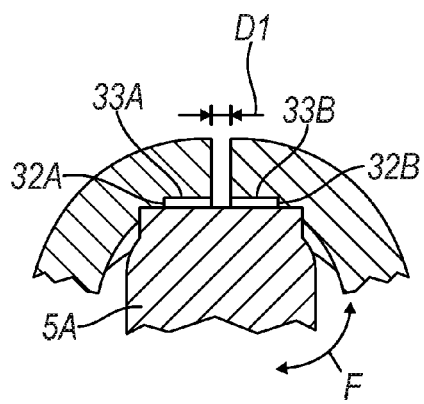
FIG. 4A is a section taken on the line 4-4 of FIG. 3, with the cleat associated with the pedal in a first of its positions.

When the user rests the foot on the pedal, the cleat is normally made to "snap" into the first seat 20 closer to the axis A. This situation is represented in FIG. 4A.

Figure 4B:
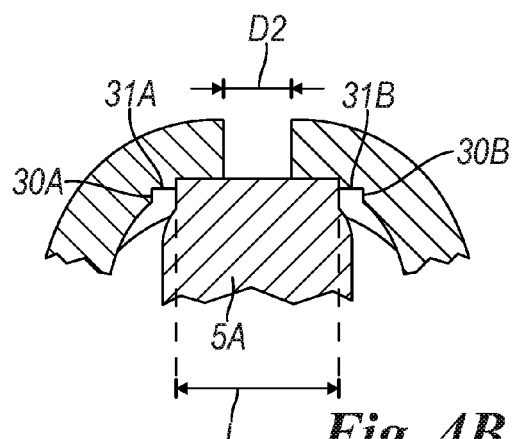
FIG. 4B is a section taken on the line 4-4 of FIG. 3, with the cleat associated with the pedal in a second of its positions.

If during the use of the bicycle the user considers it necessary to change the pedal stroke setting, by slightly shifting forwards the point of resting of the foot on the pedal crank to achieve a more pointal pedal stroke, the user makes a movement similar to that made for releasing the pedal in a conventional system, and then twists the foot (and consequently the cleat), which inclines slightly (in accordance with the arrow F of FIG. 4). This movement causes the arms to diverge, which flex elastically to hence enable the cleat to slide forward and snap into the second seat (see FIG. 4B). In this situation, the arms 23 and 24 are slightly flexed (elastically) and the distance from the front ends 23A, 24A increases mutually passing from D1 to D2 (greater than D1).

In this configuration the distance between the lateral wall of the second seat increases and becomes substantially equal to the width of the cleat. As easily apparent, in this configuration the position of the user's foot is advanced relative to the preceding, in which the cleat was housed in the first seat. In particular, the position of the foot (and hence of the shoe and of the cleat) is advanced relative to the axis A by a distance D4 equal to the distance existing between the front wall 33A and 33B of the second recess and the front wall 31A and 31B of the first recess.

To return to the previous position the cyclist has merely to release the cleat from the pedal and reposition it thereon. Coupling will take place automatically with the cleat in the first seat, given that extracting the cleat from the second seat results in elastic return of the arms 23 and 24 to their rest position.

The described configuration of the pedal makes it possible to adjust the position of the foot on the pedal in an extremely natural manner, even during a sporting competition or the normal activities of the cyclist, without having to interrupt it.

In an alternative embodiment of the invention other means can evidently be provided for achieving the positioning of the cleat in seats differently located relative to the axis A.

A number of seats greater than two can be provided enabling greater possibility of adjusting the cleat positions. To this end, three or more seats will be provided all similar to that already described.

Figure 5:
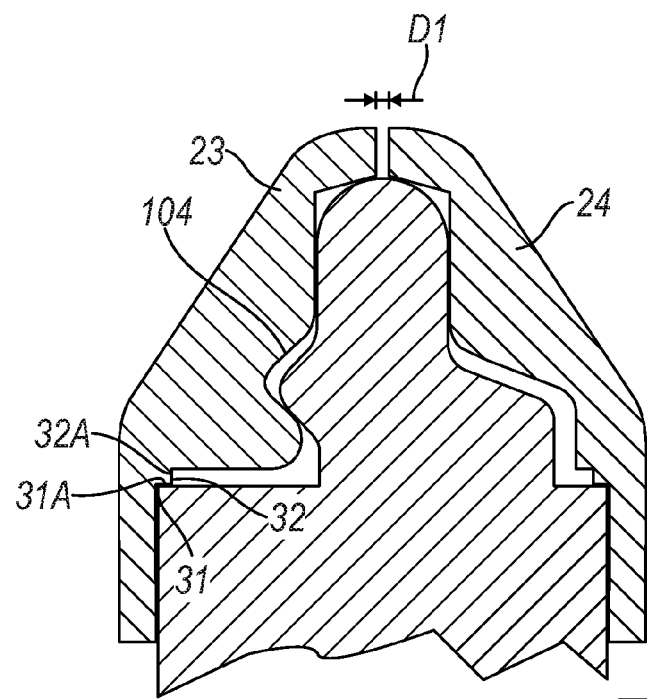
FIGS. 5 and 6 show a simplified partial section through an alternative embodiment of the pedal and of a cleat which cooperates with it.
Figure 6:
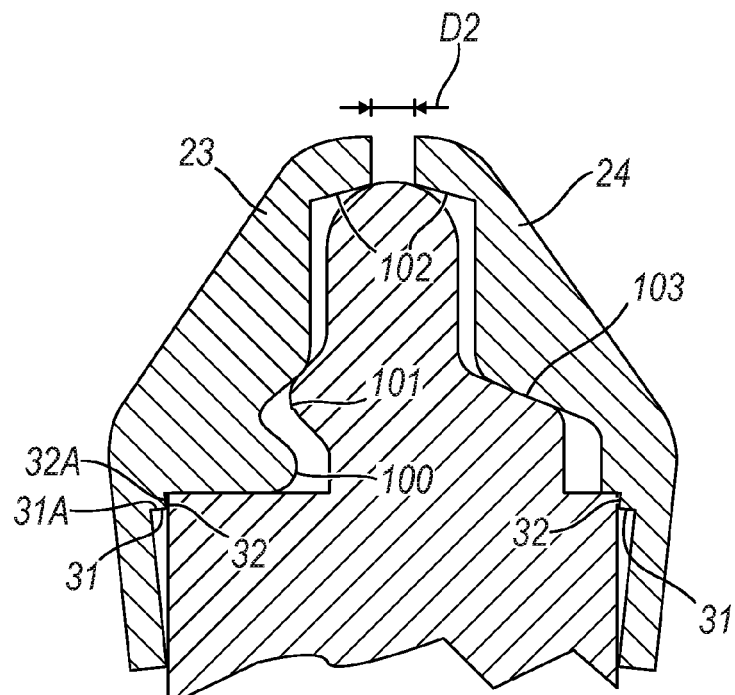

FIGS. 5 and 6 show a different embodiment. Here, the pedal presents a compartment defined by its two arms, suitably shaped to receive a projecting portion of the cleat. When a user twists the foot, the compartment and projecting portion cooperate to enable the cleat to slide from the first to the second position.

In describing the compartment in detail, it can be seen that it is of asymmetric shape. On one side, namely that on the left in FIGS. 5 and 6, a protuberance 100 can be seen, the shape of which is reproduced in an advanced position on the projecting portion of the cleat. In contrast the right side presents a cam 103, also reproduced in a withdrawal position on the cleat, follow by a support 104. The front part of the compartment comprises inclined walls 102 having a V shape. When a user moves the cleat by twisting the foot, the particular shape of the protuberance of the cam facilitate passage of the cleat from the first seat (FIG. 5) to the second seat (FIG. 6).

Figures from 7 to 11 show a different embodiment of the pedal of the present invention.

Figure 10:
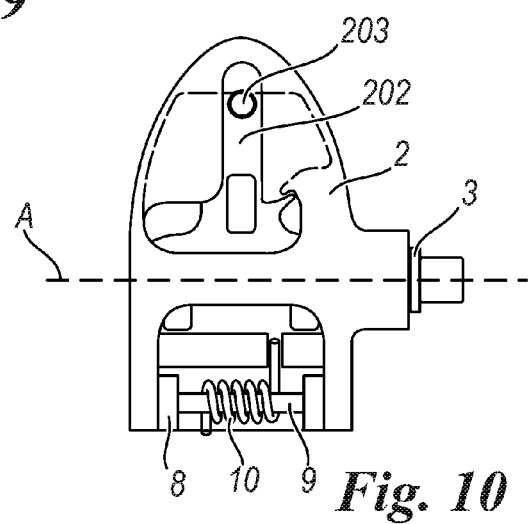
FIG. 10 is a plan view of FIG. 9 from below.

Again in this case the automatic pedal 1 is formed with a main body 2 formed preferably in a single piece of steel or other similar material. The main body presents, associated therewith, pivotal means (FIG. 10) of conventional type enabling it to be fixed (by a thread) to a pedal crank.

In particular the pivotal means 3 enables the main body to rotate freely about a horizontal axis A.

Figure 8:
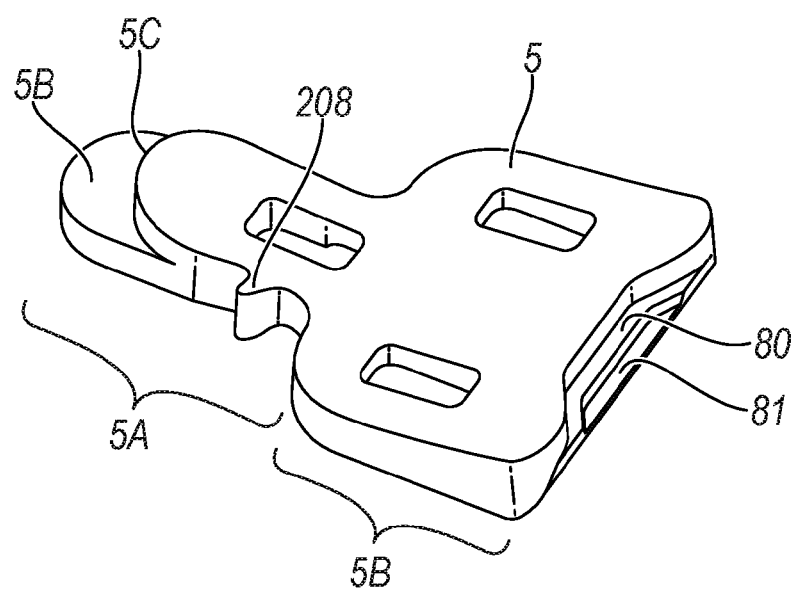
FIG. 8 is a perspective view of a cleat adapted to cooperate with the pedal crank formed with the body of FIG. 7.

Again in this case the automatic pedal 1 is configured in such a manner as to be able to fix in a removable manner a cleat 5 (visible in FIG. 8) present on the underside of the sole 6 of a cycle shoe.

In particular to enable coupling with the cleat, the main body 2 comprises a compartment 7 arranged to house a first portion 5A substantially frontal of this cleat. The pedal also comprises an element of hook configuration 8 (or coupling element) pivoted by a pin 9 to the main body and loaded in this case by a single spring 10. The load exerted by the spring on the hook is adjustable by a suitable screw 11, in a totally conventional manner. The hook element 8 configured in this manner is arranged to cooperate with a second portion 5B of said cleat to fix it in a removable manner to the pedal. In particular the hook element cooperates in this embodiment with a first and a second step 80, 81 formed in the second portion 5B of the cleat.

The hook element 8 and compartment 7 hence cooperate to fix the shoe to the pedal (by means of the cleat).

Figure 7:
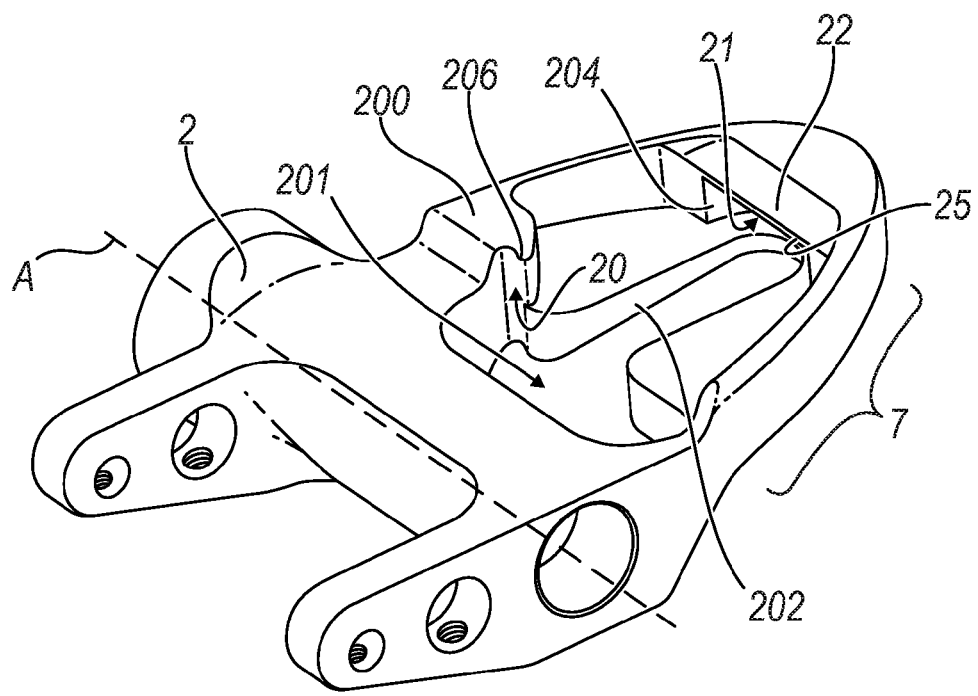
FIG. 7 is a perspective view of part of an alternative embodiment of a pedal according to the present invention.

In this case the compartment 7 comprises a first seat 20 and a second seat 21 in which the first portion of the cleat can be alternatively disposed. The first and second seat are well visible in FIG. 7.

The first seat 20 is formed within a lateral portion of the compartment 7, of such a shape as to house a profiled tooth projecting precisely from the first portion 5A of the cleat, which in this case is elongated.

The second seat 21 is provided in a front portion of the compartment 7, into which one end of the first portion is intended to abut.

In the embodiment described here in detail, two positions of the shoe are possible but evidently more seats can be provided and consequently more positions.

Passing to a more detailed description of the compartment 7, it can be seen that it is recessed with respect to an upper surface 200 of the body 2. It can be seen that the compartment 7 presents a weight reducing window 201 presenting a guide portion 202 arranged to house and guide an aligning projection 203 formed below the cleat 5. As can be seen from the figures, the compartment 7 frontally presents an upper wall 22 and a lower wall 25 arranged to vertically bound the movement of a tongue 5B of the cleat when it is inserted between the walls 22 and 25.

In the specific case, the walls 22 and 25, together with a lateral wall 204 of preferably rounded shape, define the second seat 21.

In this case the first and the second seat inside the compartment 7 are formed in two distinct positions, which are not neighbouring.

The first seat 20 is defined by a recess preferably with radiused edges and with a wall 206 inclined to the axis A. In particular the seat is concave with its concavity facing the axis A. It has a shape complementary to that of a tooth 208 forming part of the first portion 5A, and the inclined wall 206 being useful in facilitating the withdrawal of the cleat against the spring 10 of the hook, when the foot is rotated outward to release the tooth from the first seat, enabling the tongue 5B to abut against the bottom of the seat 21. Alternatively a raised wall 5C of the first portion 5A can abut frontally against the upper wall 22.

Figure 9:
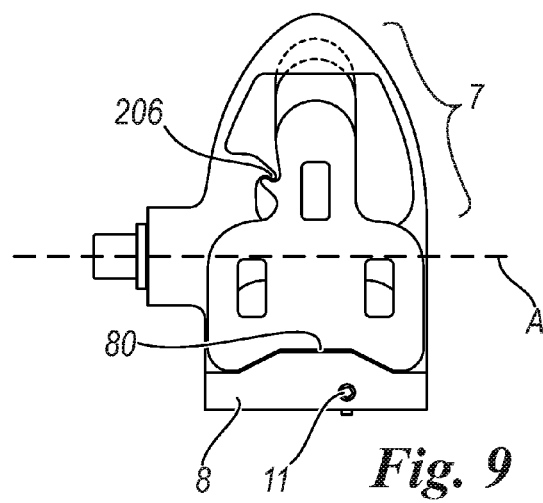
FIG. 9 is a plan view from above showing the cleat of FIG. 8 inserted into a pedal crank formed with the body of FIG. 7, with the cleat in a first position.
Figure 11:
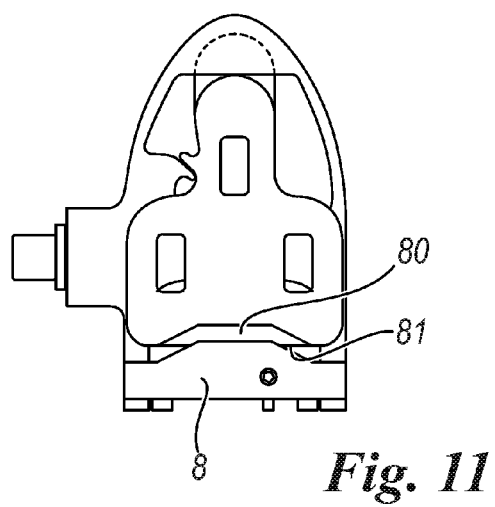
FIG. 11 is the same view as FIG. 8 but with the cleat in a second position.

It should be noted that when the tooth lies in the first seat 20 (FIG. 9), the cleat is more withdrawn from the axis A, and hence the coupling element is inserted in the first step 80 of the cleat; when instead the first portion 5A abuts in the second seat 21 (FIG. 11), the hook or coupling element cooperates with the second step 81 of the cleat, and the cleat is in a position more forward of the axis A.

Different embodiments of the invention have been illustrated, however others can be conceived utilizing the same invention concept.

The invention claimed is:

1. An apparatus comprising a bicycle automatic pedal for removably fixing to the pedal a cleat associated with a shoe of a cyclist, the automatic pedal comprising
   a main body comprising;
   pivotal means for pivoting about a substantially horizontal pedal axis to enable fixing the pedal to a pedal crank,
   a compartment arranged to abuttingly house a first front portion of the cleat associated with the shoe of the cyclist; and
   a coupling element pivoted to the main body and spring loaded, the coupling element adapted to cooperate with a second rear portion of the cleat to removably fix, together with the compartment, the cleat to the main body,
   wherein the compartment comprises:
      a first seat and at least one second seat,
      the first seat and the at least one second seat arranged to alternatively abuttingly receive and securely contain during the pedal stroke a part of the first front portion of the cleat,
      the first seat being closer to the axis of said pivotal means than the at least one second seat, and
      the first seat and the at least one second seat define engaging and positioning means for the cleat and the shoe for adjusting the position of the shoe of the cyclist with respect to the pivotal axis of the pedal, the at least one second seat engages the cleat in a position which is advanced forward relative to the position of the cleat when engaged in the first seat, and the at least one second seat is engaged by the cleat through a twisting and a sliding forward movement of the first front portion of the cleat from the first seat to the at least one second seat.

2. The apparatus as claimed in claim 1, wherein said compartment presents an upper wall and a lower wall arranged to vertically confine the movement of said cleat, and a front wall where at least said second seat is provided.

3. The apparatus as claimed in claim 2, wherein the first seat is formed along a lateral wall of said compartment.

4. The apparatus as claimed in claim 3, wherein the first seat is defined by a recess having an inclined wall for receiving a tooth projecting laterally from the first part of said cleat.

5. The apparatus as claimed in claim 4, further comprising the cleat, wherein the tooth and first seat have a complementary shape, and the inclined wall is arranged to facilitate the withdrawal of the cleat when the foot is rotated outward, to release the cleat from the first seat.

6. A pedal The apparatus as claimed in claim 5, wherein the cleat presents a projection arranged to cooperate with a guide portion provided in the compartment.

7. The apparatus as claimed in claim 2, wherein the first seat is also provided in said front wall.

8. The apparatus as claimed in claim 1, wherein said compartment is provided in a first arm and a second arm formed of elastically deformable material and projecting from the body of said pedal, the arms being symmetrically disposed and mutually facing at least in a zone in which said compartment is provided,
   said first seat defined by a first and a second recess provided respectively in the first and second arm, each recess comprising a lateral containing wall for the cleat and a frontal containing wall abutting there against, the frontal containing wall of said first and second recess being aligned,
   said second seat defined by a third and fourth recess provided respectively in the first and second arm, each of said third and fourth recess comprising a lateral containing wall provided adjacent to the front wall of said first and second recess, and by a frontal abutting containing wall, the frontal containing walls of said third and fourth recess being aligned and disposed in positions further from said pivotal axis than the front walls of the recesses defining said first seat,
   the lateral walls of the first and second recess being substantially parallel and spaced apart for receiving and housing said cleat in the first seat in a configuration in which said arms are in a substantially rest position, the lateral walls of said third and fourth recess being substantially parallel and spaced apart for receiving and housing said cleat in the second seat in a configuration in which said arms are in a substantially flexed position.

9. The apparatus as claimed in claim 8, wherein part of said upper wall is provided in said first arm and a part is provided in said second arm, and wherein part of said lower wall is provided in said first arm and a part is provided in said second arm.

10. The apparatus as claimed in claim 8, wherein said arms define a further compartment arranged to house a projecting profiled portion of the cleat, said profiled portion cooperating with the walls of said further compartment to facilitate diverging of said arms to enable passage of the cleat from the first seat to the second seat.

11. The apparatus as claimed in claim 10, wherein said further compartment has asymmetrical opposed walls, one of said opposed walls has a protuberance for cooperating with the projecting profiled portion of the cleat and the other of said opposed walls has a cam for cooperating with the projecting profiled portion of the cleat.

12. The apparatus as claimed in claim 1, wherein the first seat is defined by a recess having an inclined wall for engaging a tooth projecting laterally from the first part of the cleat.

13. The apparatus as claimed in claim 12, further comprising the cleat, wherein the tooth and first seat have a complementary shape, and the inclined wall arranged to facilitate the withdrawal of the cleat when the foot is rotated outward, to release the cleat from the first seat.

14. The apparatus as claimed in claim 1, further comprising the cleat wherein the cleat presents a projection arranged to cooperate with a guide portion provided in the compartment.

15. The apparatus as claimed in claim 1, further comprising the cleat, wherein the cleat presents a tongue projecting from its front part.

16. The apparatus as claimed in claim 1, further comprising the cleat, wherein the cleat presents a first and a second step arranged to alternatively house the coupling element when the cleat is in the first or second seat.

17. The apparatus according to claim 1, further comprising the cleat associated with a shoe of a cyclist.

18. A bicycle pedal configured to removably connect a cleat associated with a shoe of a cyclist to allow the cyclist to select a more pointed or more flat pedal stroke during cycling, the pedal comprising:
    a pedal body having a compartment arranged to receive at least a front portion of the cleat, the compartment having a first seat and a second seat each configured to selectively connect to the cleat during cycling;
    a pivotable connection associated with the pedal body, the pivotable connection configured to connect the pedal body to a pedal crank of the bicycle to allow the pedal to pivot about a pivotal axis of the pedal;
    a spring loaded coupling pivotably connected to the pedal body, the coupling adapted to cooperate with at least a rear portion of the cleat to selectively connect the cleat to the first seat or the second seat of the compartment of the pedal body,
    wherein the second seat is located on the pedal body forward and further from the pedal axis relative to the location of the first seat during operation of the pedal,
    wherein the first seat and the second seat provide a selective cleat engaging and positioning arrangement for the cleat to adjust the position of the shoe and cleat of the cyclist with respect to the pivotal axis of the pedal, the second seat engaging the cleat in a second position advanced forward from the first position of the cleat when engaged in the first seat, and
    wherein the cleat and the compartment of the pedal body are configured to allow the cleat to disengage from the first seat by twisting the shoe and cleat, and then sliding the shoe and cleat forward to then engage the second seat by advancing the cleat from the first position to the second position.

19. The pedal according to claim 18, wherein the bicycle pedal is configured to selectively change the position of the shoe and cleat to a more pointed or more flat pedal stroke during cycling.

* * * * *